March 17, 1942.      R. H. ROGERS      2,276,739
SPEED MEASURING APPARATUS
Filed July 19, 1940      3 Sheets-Sheet 1
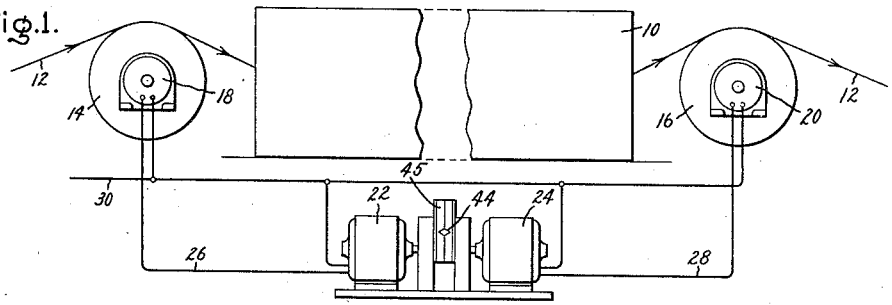
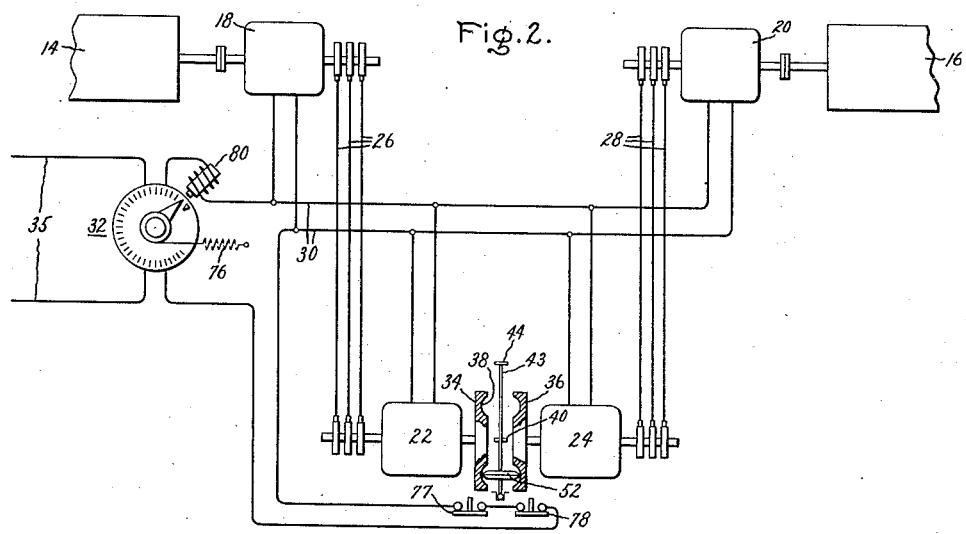
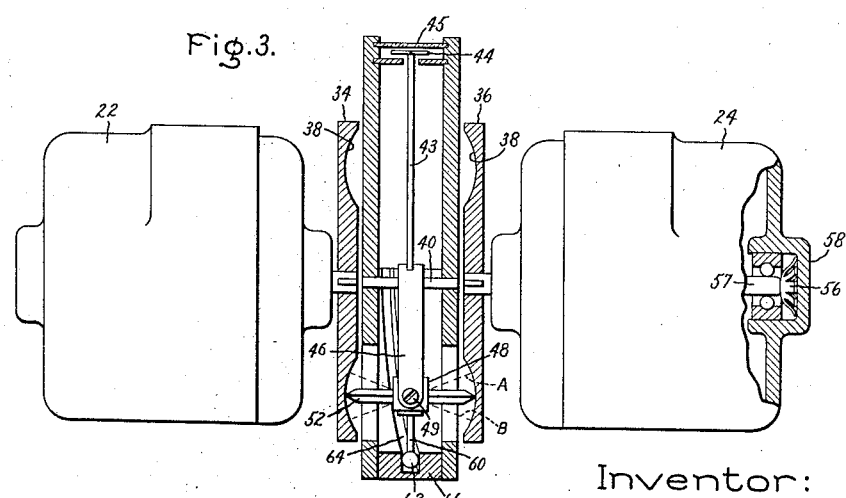
Inventor:
Robert H. Rogers,
by Harry E. Dunham
His Attorney.

March 17, 1942.  R. H. ROGERS  2,276,739
SPEED MEASURING APPARATUS
Filed July 19, 1940  3 Sheets-Sheet 2
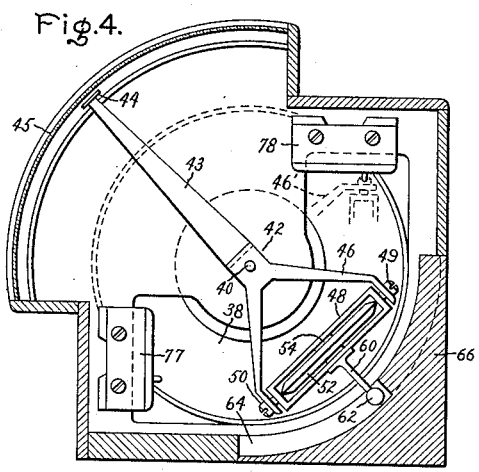
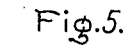
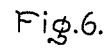
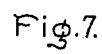
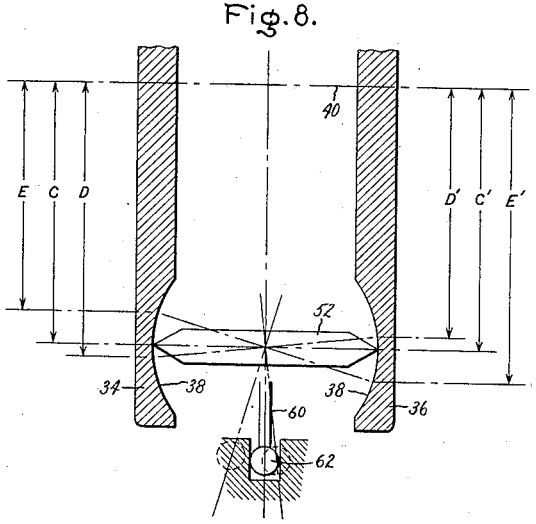
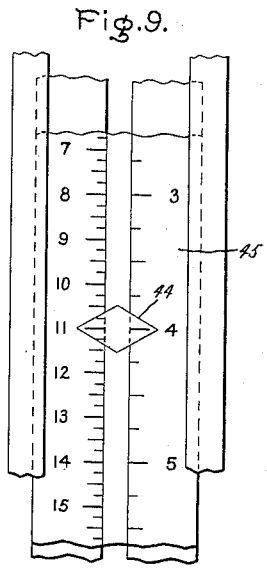
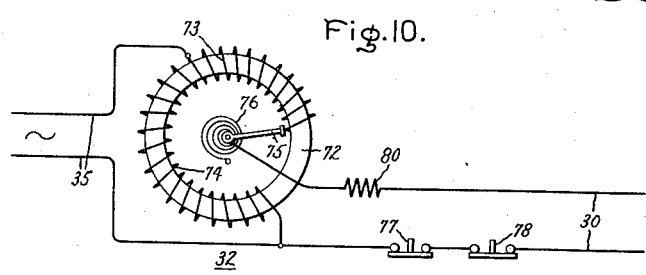
Inventor:
Robert H. Rogers,
by Harry E. Dunham
His Attorney.

March 17, 1942.                R. H. ROGERS                2,276,739
                          SPEED MEASURING APPARATUS
                  Filed July 19, 1940            3 Sheets-Sheet 3
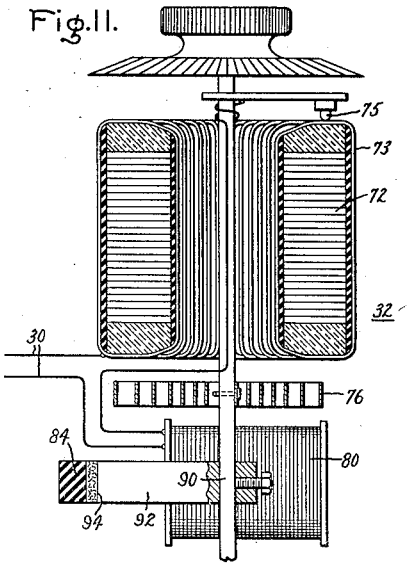
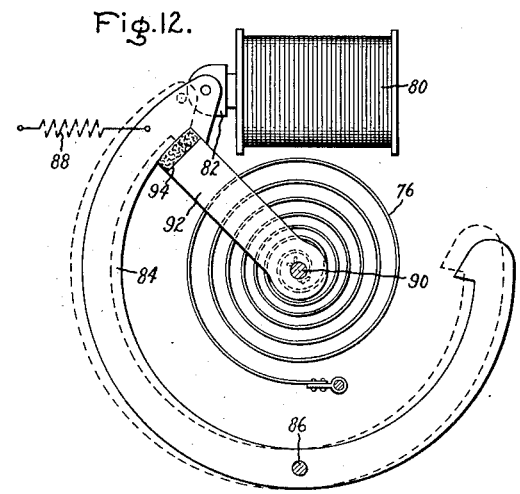
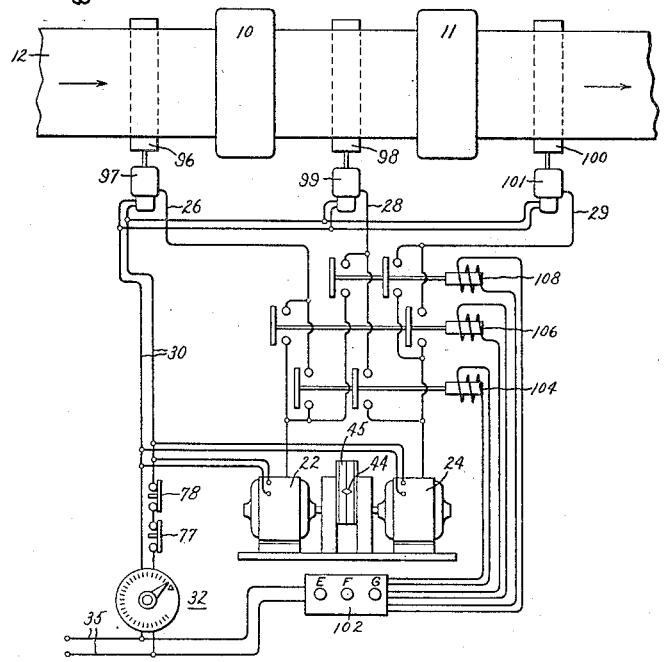
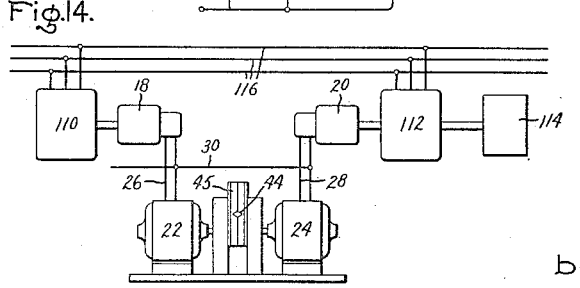
Inventor:
Robert H. Rogers,
by Harry E. Dunham
His Attorney.

Patented Mar. 17, 1942

2,276,739

UNITED STATES PATENT OFFICE

2,276,739

SPEED MEASURING APPARATUS

Robert H. Rogers, Schenectady, N. Y., assignor to General Electric Company, a corporation of New York Application July 19, 1940, Serial No. 346,387

11 Claims. (Cl. 26—18.5)

This invention relates to speed measuring apparatus and more particularly to apparatus for measuring and indicating the percentage difference in the speeds of two rotary elements associated with apparatus employed for treating continuously moving fabric material.

My invention may be employed generally for measuring the percentage difference in the speeds of two rotary elements in widely differing industrial fields but at present I regard the continuous measurement of the longitudinal shortening or shrinkage or the dimensional change per unit length of fabric material as it runs through a Sanforizing machine as the most important practical application. Accordingly, my invention will be particularly described in connection with a Sanforizing machine for carrying out the Sanforizing process to shorten or elongate longitudinally such fabric material but I wish it clearly understood that my invention is not limited to this industrial field.

In referring to the Sanforizing process which has now become well known, I have in mind a controlled shrinking process in which the yarns or fibers of a fabric are mechanically re-arranged a predetermined amount so that garments manufactured from such cloths or fabrics will undergo a dimensional change of only an infinitesimal amount when subjected to a standard laundry wash. The fabric is thus shortened longitudinally as it runs through the machine. However, the machine likewise may be employed to stretch or elongate the fabric, if desired.

It is an object of my invention to provide an improved device for measuring the percentage difference in the speeds of two rotary elements which is independent of the numerical difference in the specific or absolute speeds of the elements.

It is another object of my invention to provide apparatus which is automatically responsive to variations in the ratio of the speeds of two spaced rotatable members employed in a machine used for carrying out a manufacturing process or treatment of materials.

It is a further object of my invention to provide apparatus for measuring the percentage shrink or stretch or the dimensional change per unit length of a continuously moving fabric, for example, a sheet of cloth, as the same is continuously delivered from a Sanforizing machine employed for carrying out a shrinkage or elongation process.

It is another object of my invention to provide apparatus of the foregoing character which is simple and rugged in construction, reliable in use and in which the zero of the measuring device as well as the indication thereof is independent of the actual difference in the speeds of the two rotary elements but depends solely upon the percentage by which the speed of one element differs from that of the other.

In carrying my invention into effect in its preferred form, I provide a disk member driven directly or indirectly by one of the movable or rotatable elements. A second disk is provided which is suitably connected with the other rotatable element. These two disks are arranged with their axes parallel to each other and in alignment and with their faces lying in parallel planes, in opposed relation, and a short distance apart. The face of each disk is also provided with an annular groove of arcuate cross section. In the space between the faces of the two disks and positioned to make contact with the surface of the disks formed by the grooves, there is arranged a friction wheel which is adapted to assume a position with respect to the two grooves and the disks so that the product of the radius of contact of the friction wheel on one disk and the speed of the disk is equal to the product of the radius of contact of the friction wheel on the second disk and the speed of the second disk. An indicator which is movable in accordance with the arcuate movement of the means which supports the friction wheel provides an indication which is proportional to the percentage difference in the speeds of the two disks.

When the foregoing arrangement is employed for measuring the shrinkage or the elongation of a fabric, such as cloth material, as it is continuously passed through a Sanforizing machine, one of the disks is driven at a speed proportional to the linear speed of the fabric at the inlet or entrance side of the machine and the other disk is driven at a speed proportional to the linear speed of the moving strip at the exit or delivery side of the machine.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 is a diagrammatic sketch of apparatus arranged in accordance with my invention for measuring variations per unit length or the per cent shrinkage or elongation of continuously moving strip material as it emerges from a machine employed for subjecting the material to a shrinking or elongating process; Fig. 2 is a schematic view of the apparatus shown in Fig. 1 illustrating more in detail the electrical connections and other parts of the system; Figs. 3 to 7, inclusive, are detail views, partly in cross section, of certain parts of the apparatus shown in Figs. 1 and 2; Fig. 8 is a diagrammatic vertical section view of a portion of the apparatus which will be employed in explaining the principle of operation of the apparatus of my invention; Fig. 9 is a plan view showing a section of the scale with which the indicating device cooperates; Fig. 10 is an electrical circuit diagram of a control device employed with my invention; Figs. 11 and 12 are respectively detailed vertical section and partial plan views of the device shown in Fig. 10; Fig. 13 is a modified arrangement of the apparatus shown in Figs. 1 and 2 and adapted for measuring the percentage difference in the speeds of a plurality of rotary elements positioned in a machine at different stages of a continuous process, such for example, as the case where more than one Sanforizing machine is employed; and Fig. 14 is a schematic diagram illustrating how the principles of my invention may be employed for measuring the slip of an induction motor or for measuring the percentage variation in the speeds of any two rotary members.

In Fig. 1, I have indicated diagrammatically a Sanforizing machine 10 which is employed for shrinking, or elongating or stretching a continuously moving strip of cloth or fabric 12. The strip 12 is indicated as passing through the machine 10 in the direction of the arrows and enters the machine 10 after passing over a roller 14. The roller 14 may be geared to or positively driven at a speed proportional to the feed control rolls of such a machine. Similarly, at the outlet or delivery side of the machine 10 the issuing fabric material 12 passes over an idler roller 16. It will be appreciated that if the material 12 is being shrunk or shortened longitudinally as it passes through the machine 10 its linear speed will be less at the outlet or delivery side than at the inlet or entrance side so that with the employment of rollers 14 and 16 of the same diameter, such rollers will operate at different angular speeds. Similarly, if the machine 10 is being employed to stretch longitudinally or elongate the material, the roller 16 at the delivery side will have a greater angular speed than roller 14 at the entrance side. On the other hand, if there is no shrinkage or elongation, the two rollers 14 and 16 will rotate at the same angular speed.

I provide means which is responsive to the percentage difference in the angular speeds of rotary elements 14 and 16 and which is independent of the numerical difference in the specific speeds of these two elements. In the arrangement illustrated, the rotary elements 14 and 16 which are driven at speeds proportional to the linear speed of the strip 12 are adapted to drive transmitters, or generators 18 and 20 respectively, of angular-position or rotation-transmitting systems such as those sold by the General Electric Company under the registered trade-mark, "Selsyn." These transmitters are connected to Selsyn receivers or motors 22 and 24 respectively, as will be described, so that the rotation of the elements 18 and 20 is transmitted respectively to the elements 22 and 24. Fig. 1 illustrates a single line diagram of connections in which the rotor elements of the devices 18 and 22 are connected together through a three-conductor line 26. Similarly, the rotor elements of the devices 20 and 24 are connected together through a three-conductor line 28. The stator elements of the devices 18, 20, 22 and 24 are connected in parallel and energized from an alternating voltage supply 30. As indicated more clearly in Fig. 2, the alternating current supply line 30 is connected to the stator elements of the devices 18, 20, 22 and 24 through a variable voltage device 32 which is supplied from an alternating current source of supply 35. For present purposes it suffices to state that the device 32 provides suitable means for gradually raising the voltage applied to the stator elements of these devices.

With the foregoing arrangement, assume that the stator excitation circuits are energized by closing the stator excitation circuit 30. Consider, for example, the operation of the devices 18 and 22. When the stator excitation circuit is closed, an alternating current voltage is impressed on the stators of both the transmitter and the receiver. Since the receiver rotor is free to turn, it assumes a position similar to that of the transmitter rotor. Thus, as the rotor of the transmitter 18 is turned, the rotor of the receiver 22 rotates at the same speed and in the same direction. The Selsyn devices 20 and 24 cooperate in the same manner but the direction of rotation of device 24 is reversed with respect to device 22. The theory underlying the operation of such devices is well known and for this reason a detailed description of the method of operation is not presented here.

These Selsyn devices per se are not a part of my invention and I have briefly described them only as an aid to a better understanding of the operation of my invention. As a matter of fact, such devices may be replaced by simple synchronous generators and motors or by a mechanical drive arrangement; but I prefer to employ electrical devices for the specific application described because of the fact that the rollers 14 and 16 may be many feet apart which would create quite a problem in a mechanical system to transmit the motion of the rollers to an indicating device.

Referring also to Figs. 3 and 4 of the drawings it will be seen that connected to the rotary elements of the Selsyn devices 22 and 24 are disks 34 and 36, respectively. An annular groove 38 of arcuate or curved cross section is formed in the face of each disk. The disks are spaced a short distance apart with their rotary axes in alignment and with the grooves 38 facing each other. Pivotally mounted to swing in an arc about an axis 40 which is in alignment with the rotary axes of the Selsyn devices 22 and 24 is a member 42 comprising an arm 43 to which is attached an indicator 44 which is adapted to cooperate with a scale 45. The opposite end of the member 42 includes a fork or yoke-like portion 46. A rectangular frame 48 is pivotally supported at its short sides between the arms of the yoke at 49 and 50. Rotatably supported within the radially suspended frame 48 is a friction wheel 52. The wheel 52 is mounted to rotate about an axis 54 which is at right angles to the pivotal axis of the frame 48. The contact surface of the friction wheel 52 makes contact with the curved surface of each of the annular grooves 38 formed in the faces of the disks 34 and 36. The radius of curvature of the grooves is constant and corresponds substantially to the radius of the friction wheel. Thus as the frame 48 is pivoted about its supports 49 and 50, thereby causing the rotary axis of the wheel 52 to pivot a corresponding amount, the friction wheel makes contact with the surface of each groove at all times. Referring to Fig. 3, if, for example, the frame 48 is pivoted counter-clockwise the wheel 52 will move say to the position A. Similarly, if the frame is pivoted in the clockwise direction the axis of the wheel will rotate a corresponding amount and the wheel will then occupy some displaced position such as B. Since the wheel 52 is pivoted centrally to the curved surfaces on the face of the disks, the wheel makes contact with the arcuate surface of each annular groove at all times.

The proper amount of friction between the arcuate surface of each of the grooves 38 and the friction wheel 52 is obtained by a compression spring 56 positioned between one end of the shaft 57 of each Selsyn receiver and the frame 58. These springs serve to urge the disks 34 and 36 toward each other.

To obtain a better understanding of the principle of operation, refer to Fig. 8 which shows a detailed section view of the disks 34 and 36 and the friction wheel 52 engaging the surface of the grooves 38. The friction wheel 52 will assume the position shown when the two disks 34 and 36 are rotating at the same angular speed. For this condition, the product of the dimension C and the speed of the disk 34 is equal to the product of the dimension C' and the speed of the disk 36. Assume now that the disk 36 rotates at a higher speed than the disk 34. Under such conditions, the frame 48 rotates about its pivot points 49 and 50, due to the movement of the friction wheel 52 to a position on the disks 34 and 36 at which, for example, the product of D and the speed of the disk 34 is equal to the product of the dimension D' and the angular speed of the disk 36. Similarly, if the disk 36 moves at a slower angular velocity than the disk 34, the friction wheel 52 will assume a position on the surface of the disks 34 and 36 at which, for example, the product of E and the speed of disk 34 is equal to the product of E' and the speed of disk 36. In other words, the axis of the friction wheel always assumes a position such that each disk tends to drive the friction wheel at the same angular speed. From the foregoing analysis of the principle of operation it is obvious that the amount of pivotal movement of the frame 48 and the axis of rotation of the friction wheel about pivot points 49 and 50 is independent of the absolute or actual difference in the angular speeds of the disks 34 and 36 but depends upon the percentage difference in these speeds.

I provide means for producing an arcuate or rotary movement of the member 42 including the indicator 44 about the rotary axis 40 in proportion to the pivotal movement of the suspension frame 48 of the wheel 52 which is in turn, as has been shown, proportional to the percentage difference in the angular speed of the disks 34 and 36, or the per cent or per unit length shrinkage, elongation or stretch of the material. In the arrangement illustrated in Fig. 4, an arm 60 having a spherical end portion 62 in mounted in perpendicular relation to one of the long sides of the rectangular frame 48 and at right angles to the pivotal axis of the frame. The spherical end 62 is adapted to move in a cam groove 64 of helical configuration which is formed in the concave surface of a block member 66 as shown in Figs. 3, 4 and 5. The pivotal axis of the frame 48 which passes through the pivot points 49 and 50 is represented by the line 68 in Fig. 5 and always lies in the plane of movement of the member 42. The point 70 at which the axis line 68 intersects a line drawn through the center of the groove 64 determines the zero position of the indicator 44, that is to say, the position of the wheel 52 as shown in Fig. 3 when both of the disks 34 and 36 are rotating at the same angular speed.

Assume for example, a groove 64 having the same pitch as the groove 64 of Figs. 3, 4 and 5. Referring to Fig. 3, when the disk 34 is rotating at a higher angular speed than the disk 36 the frame 48 pivots in a clockwise direction, as viewed in Fig. 3, and the ball 62 moves upwardly in the groove away from the observer causing a simultaneous arcuate movement of the indicator 44 toward the observer or counterclockwise as viewed in Fig. 4. Similarly, movement of the ball 62 downwardly from the point 70 in the groove corresponds to the condition when the disk 36 is rotating at the greater angular speed and the indicator 44 moves in a clockwise direction. Consequently, with the indicating device 44 in the position corresponding to equal angular speeds of the disks 34 and 36, as shown in Fig. 4, movement of the indicator to the left of the zero position denotes a higher angular speed for the element 34 and if the element 34 is being driven by the input roll 14 or at a speed proportional thereto and the machine 10 is being employed to stretch or elongate the material 12, indications to the left of zero would correspond to percentage stretch or elongation or to the elongation per unit length of material. Similarly, movement of the indicator 44 to the right of the zero position would correspond to the condition when the machine 10 is being employed to shrink the material 12 so that the indications would be proportional to the per cent shrinkage or to the shrinkage per unit length of material.

In Fig. 6, I have shown a modified form of the block 66 in which the groove designated as 64a is provided with a different pitch but intersects the line 68 at the same point as indicated at 70. It will thus be seen that smaller pivotal movement of the axis of rotation of the friction wheel 52 is required to produce a full scale movement of the arm 42 which carries the indicator 44. Consequently, by varying the pitch of the helical groove formed in the block, the range or the percentage difference in speed which corresponds to full scale deflection may be altered.

In Fig. 7 I have shown a further modification in which a helical groove 64b is arranged in the block 66 in such a manner as to change the zero point to the position 70'. In the arrangement of Fig. 4 the zero position of the indicator 44 would thus be moved considerably to the left of that shown. It will thus be seen that by the employment of blocks 66 having grooves of different pitch formed therein and which cross the line 68 at different points, the zero point may be located at any point on the scale 45 so that the whole scale may be employed either to represent longitudinal shrink or elongation or a combination of the two and the range may be adjusted as desired.

In Fig. 9, I have shown a detailed view of the scale 45 which cooperates with the movable indicator 44. The scale is shown graduated, for example, in inches per yard when the device is being employed in connection with the Sanforizing machine 10 either to shrink or elongate the material. If desired, the left side of the scale may be graduated in per cent elongation or shrinkage. As clearly indicated in Fig. 4, the indicator 44 is adapted to move under the scale 45 in order not to obscure from view of the observer the scale graduations.

In Figs. 10 and 11, I have shown respectively a schematic electrical circuit diagram and a vertical section view of the variable voltage device 32 which is illustrated in Fig. 2 for controlling the application of alternating voltage from the source of supply 35 to the circuit 30 of each of the rotor elements of the Selsyn devices. The device 32 comprises a magnetic core 72 on which is wound a current conducting coil 73. In the arrangement shown, the coil 73 serves as an autotransformer, a portion 74 thereof being connected to the source of supply 35. An adjustable arm 75, shown in the full voltage position, is biased to a zero position by a helical spring 76 and provides suitable means for producing continuous and gradual changes in the voltage applied to the rotor excitation circuit 30 either when the voltage is being applied or removed. I wish to point out that instead of employing an auto-transformer arrangement the primary and secondary windings may be separately wound on the core 72, if desired. I provide a pair of limit switches 77 and 78 in the circuit 30 for interrupting the stator excitation to all of the Selsyn devices upon a predetermined arcuate movement of the member 42 in either direction from its zero position. These switches are shown incorporated in the apparatus of Fig. 4 and are adapted to be operated by the yoke or forked member 46. The dotted position 46' of the movable member 42 is shown in engagement with the operating member of the limit switch 78. These switches have the effect of removing the excitation from the Selsyn devices and thus prevent any destructive action to the system. Connected also in the circuit 30 is a holding coil 80 which serves to hold the arm 75 in the full voltage position of Fig. 10.

Referring more particularly to Figs. 11 and 12, I have shown the operating or core member 82 of the solenoid or holding coil 80 connected to one end of a rocker member 84 which is pivotally mounted intermediate its ends at 86 and which is biased outwardly by a spring 88. Associated with an operating shaft 90, to which is connected one end of the spring 76 and which operates the movable arm 75 to adjust the voltage, is a second arm 92 having a friction surface or end portion 94 which engages the inner surface of the rocker member 84.

When the rocker member 84 is in the position shown by the full lines, which corresponds to the condition when the solenoid 80 is fully energized and the arm 75 is in the full voltage position, the rocker arm is held firmly against the friction surface 94 and the shaft 90 is thereby prevented from rotating backwards to return the arm 75 to the "no" voltage position. Assume, for example, that the source of supply 35 is suddenly interrupted. If the operating arm 75 could return suddenly to its zero voltage position, there would be a voltage suddenly induced in the excitation circuits of the Selsyn devices which would tend to upset the balance of the two disks 34 and 36 and perhaps cause violent shock to the pointer or indicator. Due to the inertia and the unbalanced condition of the rocker element 84 and by virtue of the frictional resistance between the surface 94 and the rocker element 84, the arm 75 is caused to return slowly to zero upon such interruption of power, the rocker element 84 then assuming the position shown by the dotted lines. This gradual reduction in the portion of the winding 73 in circuit with the stators or excitation elements of the Selsyn devices and the arrangement thus tends to prevent shock to the system. Also, as previously pointed out the arrangement 32 provides means whereby the Selsyn devices 22 and 24 may be effectively connected to their respective transmitting elements without causing shock to the indicating device.

In Fig. 13 I have shown a modification of the arrangement of Figs. 1 and 2 in which the apparatus of my invention is adapted to the measurement of the change per unit length or percentage change in length of the material 12 which is being treated by a plurality of shrinking or elongating devices 10 and 11. In order to measure the percentage change in longitudinal dimension of the strip 12 caused by the treating machine 10, it is merely necessary to measure the per cent difference in the angular speed of the roller elements 96 and 98, which are positioned respectively at the entrance and delivery sides of the machine 10. Similarly, to measure the percentage change in length produced by the second machine 11, the per cent difference in the angular speeds of rollers 98 and 100 is measured. Selsyn transmitting devices 97, 99 and 101 are connected to the rollers 96, 98 and 100, respectively. A push button station 102 is provided with means for selectively energizing relays 104, 106 and 108. For example, by pushing the button E the relay 104 may be energized to connect the Selsyn transmitters 97 and 99 to the receivers 22 and 24, respectively, so that the indicator 44 responds to the per cent difference in speed of the rolls 96 and 98. Similarly, by pushing the button F the relay 106 is energized and the indicator 44 responds to the per cent difference in the speeds of the rolls 96 and 100, by pushing the button G, the relay 108 is energized thereby connecting the transmitters 99 and 101 and the receivers 22 and 24 to measure the per cent difference in the speeds of the rolls 98 and 100. It will thus be seen that the device is adapted to obtain an indication proportional to the per cent or per unit length shrinkage or elongation of the material at any point in the treating process.

In the foregoing arrangements, by watching the indicator 44 the operator may manually adjust the machine 10 or 11 or both as the case may be to maintain a substantially constant degree of shrinkage or elongation of the material 12.

As another illustration of an industrial application in which the principles of my invention may be applied the material 12 may represent paper passing through a paper machine which is to be "drawn" or creped by the machines 10 and 11. In this instance, the indicating device would indicate the draw or crepe in proper units between sections of the paper machine.

In Fig. 14, I have shown a further modification wherein the principles of my invention are applied to the measurement of the per cent slip of an induction motor. In this case, the Selsyn transmitters 18 and 20 are driven respectively by a synchronous motor 110 and an induction motor 112 the slip of which is to be measured and which drives a load 114. The synchronous motor 110 and the induction motor 112 to be tested are energized from a suitable alternating current source of supply 116. As will be clear from the description of the foregoing arrangements, the per cent difference in speed of the transmitters 18 and 20 is indicated by the indicator 44 on the scale 45. It will be appreciated that the respective rotary elements of the synchronous machine and the induction motor may be connected directly to the disks 34 and 36 but the present arrangement is preferred because of its convenience and flexibility. This arrangement may also be used for comparing the speeds of aircraft or marine engines.

I wish to point out also that while I have illustrated my invention and particularly described its use in connection with a machine for shrinking or elongating fabric or cloth material, the principles disclosed are also adaptable for use in rolling mills wherein metals and other materials are reduced to sheets or strips of uniform gage or thickness by means of reducing rolls. In this case the rollers 14 and 16 would be positioned respectively on the entrance and delivery sides of the reducing rolls. In such an instance, the indicating device may be calibrated directly in thickness and by watching the indicator, the operator may adjust the operation of the mill to maintain the gage of the material substantially constant.

While I have illustrated and described particular embodiments of my invention for the purpose of explaining the principle of operation, it will be obvious to those skilled in the art that various modifications may be made without departing from the spirit of my invention and I therefore aim to cover all such modifications as fairly fall within the spirit and scope of my invention as set forth in the appended claims.

What I claim as new and desire to secure by Letters Patent of the United States is:

1. In a device for measuring longitudinal dimension changes in a continuously moving strip of material as the material passes through a machine which acts on the material to produce said dimensional changes therein, a pair of rotatable members, means for driving said members respectively at angular speeds proportional to the linear speeds of said material entering and issuing from the machine, said rotatable members being arranged with their rotary axes in alignment, a rotary friction wheel associated in driven relation with said rotatable members and adapted to have its rotary axis assume a position which varies in accordance with variations in the ratio between said angular speeds, and means responsive to changes in the position of said rotary axis.

2. In a device for comparing the speeds of two rotary elements, a first disk-like member having an annular groove formed in the face thereof, a second disk member having an annular groove formed in the face thereof, said disks being driven respectively at angular speeds proportional to the speeds of said rotary elements, said disks being further arranged with their rotary axes in alignment and with said grooves in opposed relation, a friction wheel positioned between said disks and adapted to make contact respectively with the surface included by the grooves of said disks, the rotary axis of said friction wheel being movable in accordance with changes in the point of contact of said friction wheel with the surfaces of said grooves, and means operable in accordance with changes in the position of said rotary axis.

3. In a device for measuring the percentage change in the longitudinal dimension of a continuously moving strip of cloth material during its passage through a machine, a first member driven at an angular speed related to the linear speed of said strip at the entering end of the machine, a second member driven at an angular speed related to the linear speed of said strip at the delivery end of the machine, said first and second members being arranged with their rotary axes in alignment and means for obtaining indications proportional to variations in the ratio between the angular speeds of said first and second members.

4. In a device for indicating the percentage variation in length of a continuously moving cloth material due to its passage through a machine, a disk driven at an angular speed related to the linear speed of the entering material, a disk driven at an angular speed related to the linear speed of the delivered material, said disks being in axial alignment, a friction wheel having an axis of rotation perpendicular to said disks' axes and associated in driven relation with said disks, means for mounting said wheel for bodily movement about an axis coincident with the axes of said disks, and means responsive to movement of said mounting means for indicating the percentage variation in length of the material.

5. In a device of the class described, a first shaft, a second shaft, said first and second shafts being independently driven and being arranged in axial alignment, a disk secured to said first shaft, a disk secured to said second shaft, said disks being arranged with their faces in opposed parallel relation, a rotatable friction wheel positioned intermediate the faces of said disks and adapted to make contact with said disks and assume an axial position according to the percentage difference in the speeds of said first and second shafts, and means operable in accordance with variations in the axial position of said friction wheel.

6. In a device for measuring the amount of longitudinal dimension changes in a continuously moving strip of fabric adapted to be treated by a machine, a first means at the entrance side of the machine for converting the linear motion of the strip to a proportional rotary motion, a second means at the exit side of the machine for converting the linear motion of the strip to a proportional rotary motion, Selsyn transmitting devices connected respectively to rotate in accordance with said first and second means, Selsyn receiver devices associated respectively with said transmitters, said receivers being positioned with their rotary elements in axial alignment, a pair of disks, one of said disks being driven by one of said receivers and the other of said disks being driven by the other receiver, and means associated with said disks responsive to the percentage difference in the angular speeds of said disks.

7. In a device for measuring the change in longitudinal dimension per unit length of a continuously moving strip of fabric adapted to be treated by a machine, a first means at the entrance side of the machine for converting the linear motion of the strip to a proportional rotary motion, a second means at the exit side of the machine for converting the linear motion of the strip to a proportional rotary motion, electrical transmitting devices connected respectively to rotate in accordance with said first and second means, electrical receiver devices associated respectively with said transmitters, said receivers being positioned with their rotary elements in axial alignment, a pair of disks, one of said disks being driven by one of said receivers and the other of said disks being driven by the other receiver, means associated with said disks for obtaining a measurement responsive to the percentage difference in the angular speeds of said disks, means whereby excitation may be applied to said electrical transmitting and receiving devices in a manner to prevent shock to said measuring means, and means associated with said excitation applying means for preventing shock to said measuring means upon failure of the source of excitation.

8. A speed ratio measuring device including a first disk member and a second disk member, said disks being driven respectively at angular speeds proportional to the two speeds the ratio of which is to be determined, a friction wheel associated in driven relation with said disks, and means for mounting said wheel for movement about three axes each being perpendicular to the other.

9. A speed ratio measuring device including a first disk member having an annular groove formed in a face thereof, a second disk member having an annular groove formed in the face thereof, said disks being driven respectively at annular speeds proportional to the two speeds the ratio of which is to be determined, said disk members being arranged with their rotary axes in alignment, a friction wheel adapted to make line contact with the surfaces of said grooves and rotate about an axis perpendicular to the axis of rotation of said disks, means for mounting said wheel for oscillatory movement about an axis perpendicular to its axis of rotation and for bodily movement so that said wheel may move an amount proportional to the percentage difference in the speed of rotation of said disks, and means responsive to the amount of said last mentioned movement.

10. A speed ratio measuring device for measuring the ratio of two speeds including a pair of rotatable members, means for rotating said members respectively at angular speeds proportional to the two speeds the ratio of which is to be determined, said rotatable members being arranged with their rotary axis in alignment, annular grooves in opposed faces of said disks, a friction wheel positioned between said disks and adapted to make line contact with the surfaces of said grooves, means for varying the relation between the line contact between said wheel and said disks and their respective rotational axes in proportion to the ratio of their speeds, and means for mounting said wheel for bodily movement so as to indicate at any instant the ratio of these speeds.

11. A speed ratio measuring device including a first disk member having an annular groove formed in a face thereof, a second disk member having an annular groove in the face thereof, said disks being driven respectively at angular speeds proportional to the two speeds the ratios of which are being determined, said disks being arranged with their rotary axes in alignment and with said grooves in opposed relation, a friction wheel adapted to rotate about an axis perpendicular to the axes of rotation of said disks and adapted to make line contact with the surfaces of said grooves, means for mounting said wheel for bodily movement about an axis coincident with the axes of said disks, means including said last-mentioned means for mounting said wheel for oscillatory movement about an axis perpendicular to the axis of rotation of said wheel, and means on the stationary portion of said device and cooperable with said mounting means for causing said wheel to oscillate about the axis perpendicular to its axis of rotation upon a variation appearing between the speeds of the disks.

ROBERT H. ROGERS.